(12) United States Patent
Xu et al.

(10) Patent No.: US 11,297,142 B2
(45) Date of Patent: Apr. 5, 2022

(54) TEMPORAL DISCRETE EVENT ANALYTICS SYSTEM

(71) Applicant: NEC Laboratories America, Inc., Princeton, NJ (US)

(72) Inventors: Jianwu Xu, Titusville, NJ (US); Haifeng Chen, West Windsor, NJ (US); Bin Nie, Williamsburg, VA (US)

(73) Assignee: NEC Corporation

( * ) Notice: Subject to any disclaimer, the term of this patent is extended or adjusted under 35 U.S.C. 154(b) by 255 days.

(21) Appl. No.: 16/776,883

(22) Filed: Jan. 30, 2020

(65) Prior Publication Data

US 2020/0252461 A1 Aug. 6, 2020

Related U.S. Application Data

(60) Provisional application No. 62/799,295, filed on Jan. 31, 2019, provisional application No. 62/806,128, filed on Feb. 15, 2019.

(51) Int. Cl.

| | |
|---|---|
| *H04L 29/08* | (2006.01) |
| *H04L 67/12* | (2022.01) |
| *G16Y 40/20* | (2020.01) |
| *G06N 5/02* | (2006.01) |
| *G16Y 20/20* | (2020.01) |
| *G16Y 40/35* | (2020.01) |

(52) U.S. Cl.
CPC ............. *H04L 67/12* (2013.01); *G06N 5/022* (2013.01); *G16Y 20/20* (2020.01); *G16Y 40/20* (2020.01); *G16Y 40/35* (2020.01)

(58) Field of Classification Search
CPC ........ H04L 67/12; G16Y 40/20; G16Y 20/20; G16Y 40/35; G06N 5/022; G06N 3/0445; G06N 20/00; G06N 3/08; G06N 5/027; H04W 4/38
See application file for complete search history.

(56) References Cited

U.S. PATENT DOCUMENTS

| | | | |
|---|---|---|---|
| 7,590,513 B2 * | 9/2009 | Jiang ...................... | G06F 11/008 703/2 |
| 9,983,924 B2 * | 5/2018 | Schnegelberger .. | G06F 11/2257 |
| 10,623,280 B2 * | 4/2020 | Smith ..................... | H04L 43/50 |
| 10,678,625 B2 * | 6/2020 | Anchuri ................ | G06F 11/079 |
| 10,795,753 B2 * | 10/2020 | Xu ........................ | G06F 11/0781 |

(Continued)

OTHER PUBLICATIONS

Luong, "Effective Approaches to Attention-Based Neural Machine Translation", arXiv:1508.04025; Sep. 2015, 11 pages.

(Continued)

*Primary Examiner* — Philip J Chea
*Assistant Examiner* — Wuji Chen
(74) *Attorney, Agent, or Firm* — Joseph Kolodka

(57) ABSTRACT

Systems and methods for evaluating another computer system using temporal discrete event analytics are provided. The method includes generating sentences of discrete event sequences for multiple sensors. The method also includes building a sensor relationship network in response to generating the sentences of discrete event sequences. The sensor relationship network is analyzed to determine relationships between the multiple sensors. The method further includes performing fault diagnosis based on the sensor relationship network and the relationships between the multiple sensors.

16 Claims, 11 Drawing Sheets

(56) References Cited

U.S. PATENT DOCUMENTS

| | | | |
|---|---|---|---|
| 2008/0086437 A1* | 4/2008 | Yuan | G06F 11/0706 |
| | | | 706/16 |
| 2008/0168018 A1* | 7/2008 | Rohlfing | H04L 41/16 |
| | | | 706/47 |
| 2012/0239981 A1* | 9/2012 | Franke | G06F 11/368 |
| | | | 714/38.1 |
| 2013/0346384 A1* | 12/2013 | Mule | G06F 16/434 |
| | | | 707/706 |
| 2016/0149996 A1* | 5/2016 | Eckert | H04L 67/2842 |
| | | | 709/217 |
| 2016/0247164 A1* | 8/2016 | Salajegheh | H04L 43/065 |
| 2017/0131700 A1* | 5/2017 | Li | G05B 19/10 |
| 2017/0223036 A1* | 8/2017 | Muddu | H04L 43/08 |
| 2018/0152338 A1* | 5/2018 | Panigrahi | H04L 41/0631 |
| 2019/0042618 A1* | 2/2019 | Potulska | G06F 16/2365 |
| 2019/0087789 A1* | 3/2019 | Barkat | G07C 5/008 |
| 2019/0113549 A1* | 4/2019 | Nakayama | G06K 9/72 |
| 2019/0121350 A1* | 4/2019 | Cella | H04L 67/12 |
| 2020/0026632 A1* | 1/2020 | Brinkmann | G06N 20/20 |
| 2020/0252461 A1* | 8/2020 | Xu | G16Y 40/20 |
| 2020/0265227 A1* | 8/2020 | Chen | G06K 9/2018 |

OTHER PUBLICATIONS

Sutslever, "Sequence to Sequence Learning with Neural Networks", arXiv:1409.3215; Sep. 2014, 9 pages.

Jiang, "Modeling and Tracking of Transaction Flow Dynamics for Fault Detection in Complex Systems", IEEE Transactions on Dependable and Secure Computing, vol. 3, Issue 4, Oct. 2006.

Papineni, "Bleu: a Method for Automatic Evaluation of Machine Translation", Proceedings of 40th Annual Meeting of the Association for Computational Linguistics, Jul. 2002, pp. 311-318.

* cited by examiner

TEMPORAL DISCRETE EVENT ANALYTICS SYSTEM

RELATED APPLICATION INFORMATION

This application claims priority to U.S. Provisional Patent Application No. 62/799,295, filed on Jan. 31, 2019, and U.S. Provisional Patent Application No. 62/806,128, filed on Feb. 15, 2019, incorporated herein by reference in their entirety.

BACKGROUND

Technical Field

The present invention relates to large-scale complex systems and more particularly to analyzing sensor time sequences.

Description of the Related Art

Modern physical or information technology systems have evolved into large-scale complex systems with many different components working synchronically to achieve multiple objects. For example, a power or chemical plant contains many different components such as heat generating components, turbine/generator component, condenser, and pump system. Thousands of sensors of different functionalities are deployed in different components to collect all sorts of information and signals. The collected signals are organized and analyzed to obtain the system status information in an operational management system. Another example is a modern information technology cloud computing system. Another example is an information technology cloud computing system. The collected information can be in continuous time series format which measures the temperature, pressure or other physical information in a power or chemical plant.

SUMMARY

According to an aspect of the present invention, a method is provided for evaluating a computer system using temporal discrete event analytics. The method includes generating sentences of discrete event sequences for multiple sensors. The method also includes building a sensor relationship network using the sentences of discrete event sequences. The sensor relationship network is analyzed to determine relationships between the multiple sensors. The method further includes performing fault diagnosis based on the sensor relationship network and the relationships between the multiple sensors.

According to another aspect of the present invention, a system is provided for evaluating another computer system using temporal discrete event analytics. The system includes a processor device operatively coupled to a memory device. The processor device is configured to generate sentences of discrete event sequences for multiple sensors. The processor device also builds a sensor relationship network using the sentences of discrete event sequences. The sensor relationship network is analyzed to determine relationships between the multiple sensors. The processor device performs fault diagnosis based on the sensor relationship network and the relationships between the multiple sensors.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
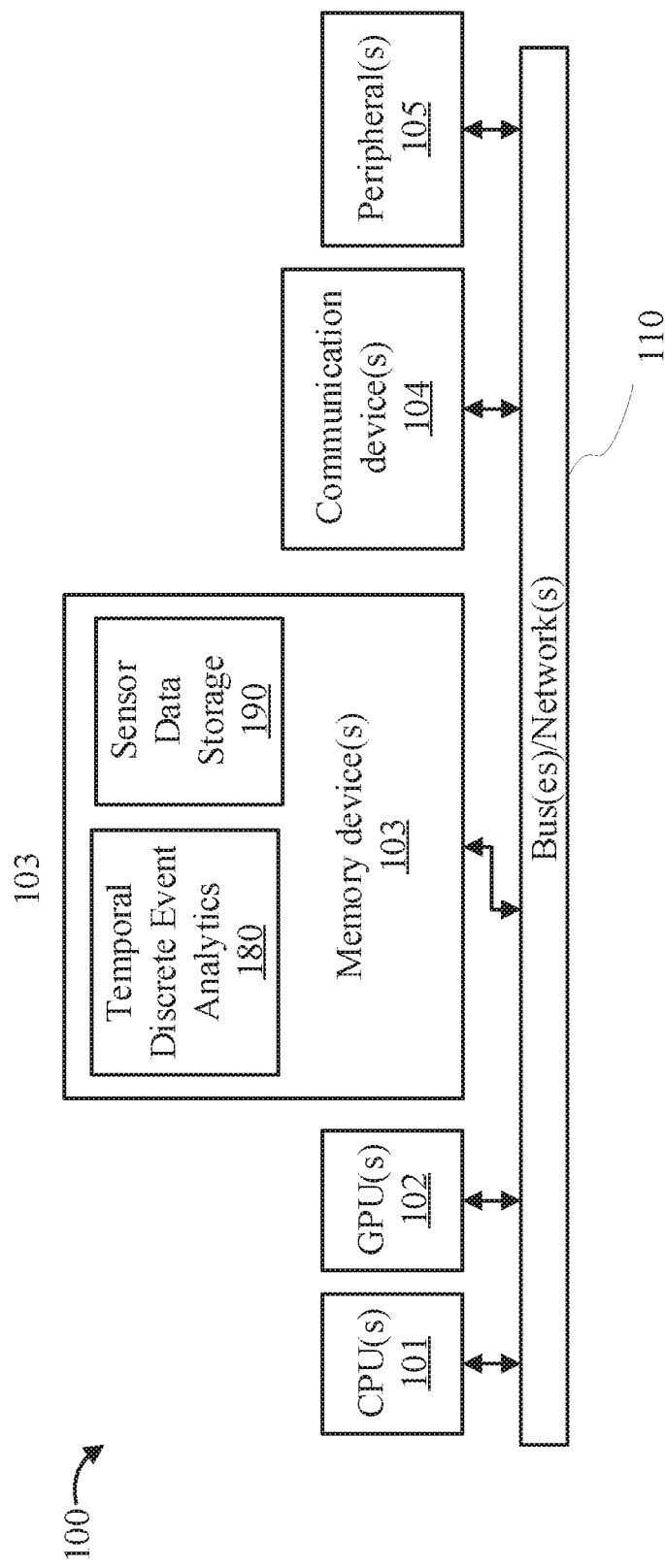
FIG. 1 is a schematic and block diagram illustrating a high-level system for temporal discrete event analytics, in accordance with an embodiment of the present invention.

In accordance with embodiments of the present invention, systems and methods are provided to organize, analyze and discover the interdependence and inter-correlation among discrete categorical event sensors (for example, from large-scale complex systems). The systems and methods determine an interdependence relationship based on language translation processes that build pairwise information structures. The systems include a machine translation system that builds models to capture the relationship between source language and target language, so that when given a sentence of source language, the system can translate the sentence of the source language into the target language.

In one embodiment, the systems can capture the pairwise relationship between the discrete event sequences of two sensors. Once the pairwise relationship is discovered, the systems construct a relationship graph where each node in the graph represents a sensor and edge between two nodes denotes the strength of the relationship between the two sensors. The graph presents the cluster structure of the sensors. Each cluster shows the strong relationship among a group of sensors which might be originated from the same physical component of power plant, or similar functional purpose. This information is presented in a graphical interface so that a system administrator can easily understand the clustering structure of the sensor.

In one embodiment, graphical clustering structure and sensor connection information will aid system administrators in identification of the potential root cause sensors and system component, understanding of error propagation in the system, and quickly devise a mitigation solution towards the problematic component.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 store program code for implementing one or more of the following: temporal discrete event analytics 180, sensor data storage 190, etc. The temporal discrete event analytics device 180 captures the pairwise relationship between the discrete event sequences of two sensors and constructs a relationship graph where each node in the graph represents a sensor and edge between two nodes denotes the strength of the relationship between the two sensors. The temporal discrete event analytics device 180 presents information in an associated graphical interface so that system administrators can understand the clustering structure of the sensor.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
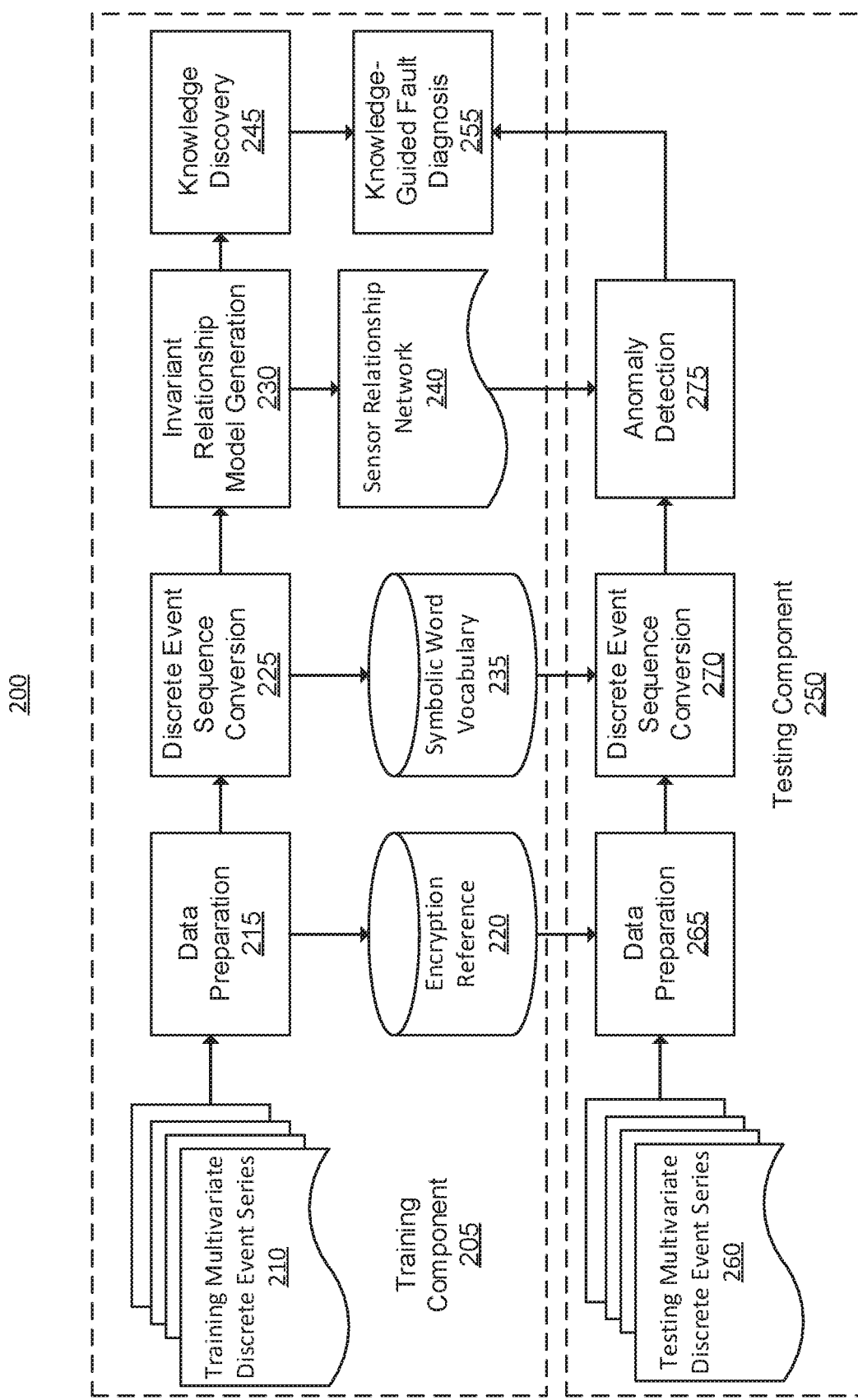
FIG. 2 is a block diagram of a temporal discrete event analytics system, in accordance with an embodiment of the present invention.

Referring now to FIG. 2, a block diagram of a temporal discrete event analytics system 200 is illustratively depicted in accordance with an embodiment of the present invention.

FIG. 2 presents the architecture of a temporal discrete event analytics system 200 (or engine), such as implemented by temporal discrete event analytics device 180. As shown, temporal discrete event analytics system 200 includes a (for example, offline) training component 205 and a (for example, online) testing component 250.

Temporal discrete event analytics system 200 analyzes the discrete categorical event sequences collected from a complex system, such as a modern power or chemical plant. Temporal discrete event analytics system 200 performs knowledge discovery by mining the interdependence and inter-correlation information among many discrete event sensors. The pairwise relationship can be transformed into cluster structures of all sensors which represents the physical or functional subgroups. Temporal discrete event analytics system 200 can present this discovered knowledge in formats that can be used in operation management (for example, system administrators can use this information in fault diagnosis when a system anomaly happens). The visual graph provided by temporal discrete event analytics system 200 provides the system administrators a direct and straightforward manner to understand the origin of system failure, how failure propagates from the original points to the neighborhood components, etc. System administrators can quickly find the potential root cause of system failure and provide mitigation solutions to bring the complex system back to normal.

Training component 205 includes components such as training multivariate discrete event series 210 (for example, received and/or processed via sensor data storage 190 in FIG. 1), data preparation 215, encryption reference 220 (for example, via a database), discrete event sequence conversion 225, symbolic word vocabulary 235 (for example, via a database), invariant relationship model generation 230, sensor relationship network 240 and knowledge discovery 245.

Testing component 250 includes components such as testing multivariate discrete event series 260 (for example, received and/or processed via sensor data storage 190), data preparation 265, discrete event sequence conversion 270, and anomaly detection 275.

Given an input of large corpus of multivariate discrete event sequences (for example, training multivariate discrete event series 210) to this system 200, data preparation 215 (component) preprocesses the event sequence, such as extracting discrete event sequences, filtering out non-representative sequences and encrypting discrete variables into characteristics. The encryption references of those discrete event sequences are stored in encryption reference 220 (database).

Then, discrete event sequence conversion 225 splits sequences of characters obtained in the data preparation 215 (component) into sequences of words. The distinct set of converted words are stored in symbolic word vocabulary 235 (database). The sequences of words can be partitioned into sentences, which can serve as the inputs of the invariant relationship model generation 230 (component).

The invariant relationship model generation 230 leverages neural machine translation models to build the pairwise relationship for each pair of sensors. The invariant relationship model generation 230 generates (for example, determines, defines, etc.) sensor relationship network 240 (for example, a multivariate relationship network), which provides useful indications to assist system administrators perform system maintenance and fault diagnosis tasks. The sensor relationship network provides the clustering structure of sensors which will be useful for system administrators in fault diagnosis. The connection between different clusters correspond to the relationship among different components of a system. The automated generated knowledge enables system administrators to quickly navigate (for example, the relationships and interactions between) huge numbers of sensors.

Knowledge discovery 245 (component) analyzes the sensor relationship network 240 to provide useful insights of the systems (for example, the underlying power plant, chemical plant, etc.) from two perspectives, for example, global connections and local connections among sensors and presents the graphical output with clustering and connection information. Based on the knowledge discovery 245 results and (multivariate) sensor relationship network 240, system administrators can perform knowledge-guided fault diagnosis 255 when failure occurs. Knowledge-guided fault diagnosis 255 (component) provides an efficient solution to help system administrators quickly discover the potential root cause of the system failure by examining the sensor relationship network graph with the discovered system knowledge.

Testing component 250 can, after the (for example, offline) training component 205 finishes the multivariate relationship model building, apply multivariate relationship model to incoming testing samples to monitor system status and detect anomalies. The (for example, online) testing component 250 consists of similar data preparation 265 (corresponding to 215) and discrete event sequence conversion 270 (corresponding to 225) to transform multiple categorical event sequences into machine "languages". The converted "language" sequences are applied to the invariant relationship model 230 constructed from the training phase to detect system anomalies. The anomaly detection 275 (process) is based on the aggregated broken invariants among all the invariant relationship pairs in the sensor relationship network 240 graph.

When the aggregated broken invariants exceed certain threshold, this indicates that a certain number of variables (sensors) deviate from system normal operation characteristics simultaneously. The potential root cause may have originated from a small number of sensors. As the error propagates and migrates to multiple components, the malfunction becomes large enough to break down the system. Therefore, the system 200 measures the aggregated broken invariants to precisely characterize the system anomaly condition. Based on implementing knowledge discovery 245 from the training phase (training component 205), the system 200 can further determine the potential root cause and differentiate different system anomalies given the different originating error component.

Figure 3:
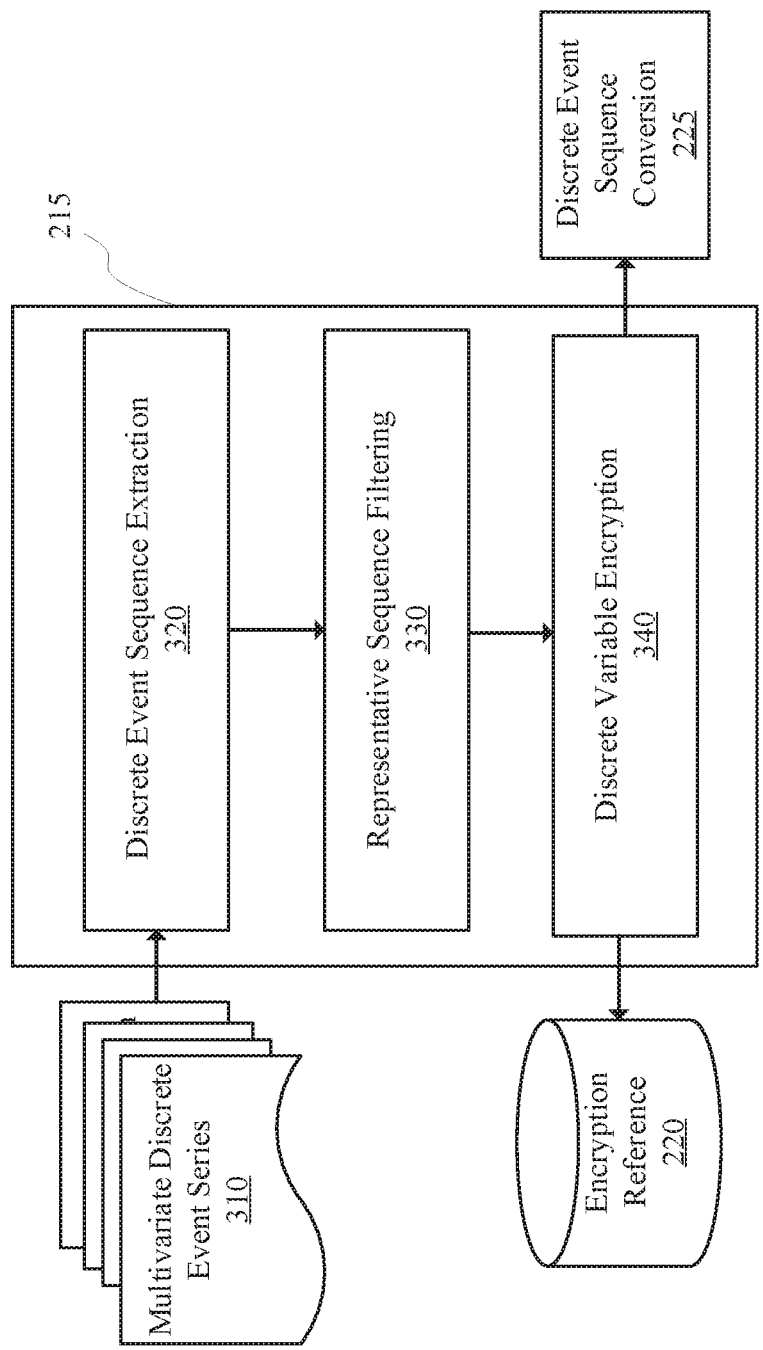
FIG. 3 is a block diagram illustrating a data preparation component, in accordance with an embodiment of the present invention.

Referring now to FIG. 3, a block diagram of a data preparation 215 (component) is illustratively depicted in accordance with an embodiment of the present invention.

As shown in FIG. 3, data preparation 215 (component, which performs in a similar manner to data preparation 265) includes discrete event sequence extraction 320, representative sequence filtering 330 and discrete variable encryption 340. Data preparation receives a set(s) of collected discrete event sequences (for example, multivariate discrete event series 310 can include training multivariate discrete event series 210 and/or testing multivariate discrete event series 260) corresponding to the output of many sensors deployed in a physical power or chemical plant. Each point in an event sequence contains a time stamp and an event record. The event record tells the sensor status at a specific time stamp. The collected discrete time sequence can be long or short dependent on the collection duration. The time sequence may have some missing value at some time stamps due to sensor malfunction or other reasons. The system 200 can discard the missing time points.

Data preparation 215 implements a process (via discrete event sequence extraction 320) that prepares the event sequences in the format that meets the input requirement of additional components (such as, for example, discrete event sequence conversion 225). The input of data preparation 215 can include a large corpus of multivariate discrete event sequences 310, while the output can include sequences of encrypted discrete events, which is passed to discrete event sequence conversion 225.

Discrete event sequence extraction 320 performs necessary data pre-processing given the input multivariate discrete event sequences 310. The raw system log files can contain event sequences in the format of both continuous data and discrete data. Moreover, the event sequences of some sensors can also be a combination of continuous and discrete data. Therefore, discrete event sequence extraction 320 separates discrete event sequences from the raw corpus of system logs. One of the features of discrete event sequences is that the cardinality is normally small. Towards this, data preparation 215 can set a threshold of the number of distinct variables to be a particular number (for example, a number such as 3, 4, 5, etc.). That is, if the cardinality of an event sequence is smaller than or equal to the particular number (for example, the number 5), discrete event sequence extraction 320 can consider the event sequence to be a discrete event sequence.

After extracting all discrete event sequences, discrete event sequence extraction 320 considers (for example, analyzes, determines, etc.) missing or duplicated timestamps in the real-world system logs. In example instances, data can be collected on a minute by minute basis. Under abnormal situations, the log systems may record the same log item multiple times or may miss some records during certain time periods (for example, especially in the end of a month). Therefore, for duplicated records at the same timestamp, data preparation 215 keeps the last record only and remove previous ones. For missing records in the end of a month, data preparation 215 does not fill in with synthetic data but truncates the records of that day in sharp hours for all sensors.

Representative sequence filtering 330 rules out meaningless event sequences. For example, some event sequences are constant (for example, no variable change) during the entire sampling period. Such sequences provide minimal (for example, barely any) contribution to later invariant relationship model generation 230. Therefore, representative sequence filtering 330 excludes those constant event sequences and discards these sensors. Representative sequence filtering 330 performs the first order of reduction in terms of the number of sensor pairs, which helps facilitate model generation process by invariant relationship model generation 230.

For the discrete event sequence of each remaining sensor after previous step (implemented by representative sequence filtering 330), discrete variable encryption 340 encrypts the discrete event sequence into characters. The original format of the event sequence in some instances could be numerical values or some commands. To be prepared for later language model, discrete variable encryption 340 prepares the discrete event sequences in the format of characters. For each discreate event sequence, discrete variable encryption 340 can collect the unique set of variables and sort them in alphabetical order. Then, discrete variable encryption 340 assign letters starting from 'a' to each variable. To prepare for potential future unseen variable, discrete variable encryption 340 assigns letter "`" (which is one character previous 'a' in ASCII table) to represent 'NAN' (not-a-number) variables. Discrete variable encryption 340 can access the encryption dictionary in the encryption reference 220 (database). Then, the encrypted discrete event sequences are ready to be passed to discrete event sequence conversion 225.

The encryption reference 220 (database) contains the mapping between any of sensor discrete sequence value and the transformed character. The purpose of encryption is to map the sensor record into (a set of) an alphabet so that the transformed sequence becomes an artificial language.

Figure 4:
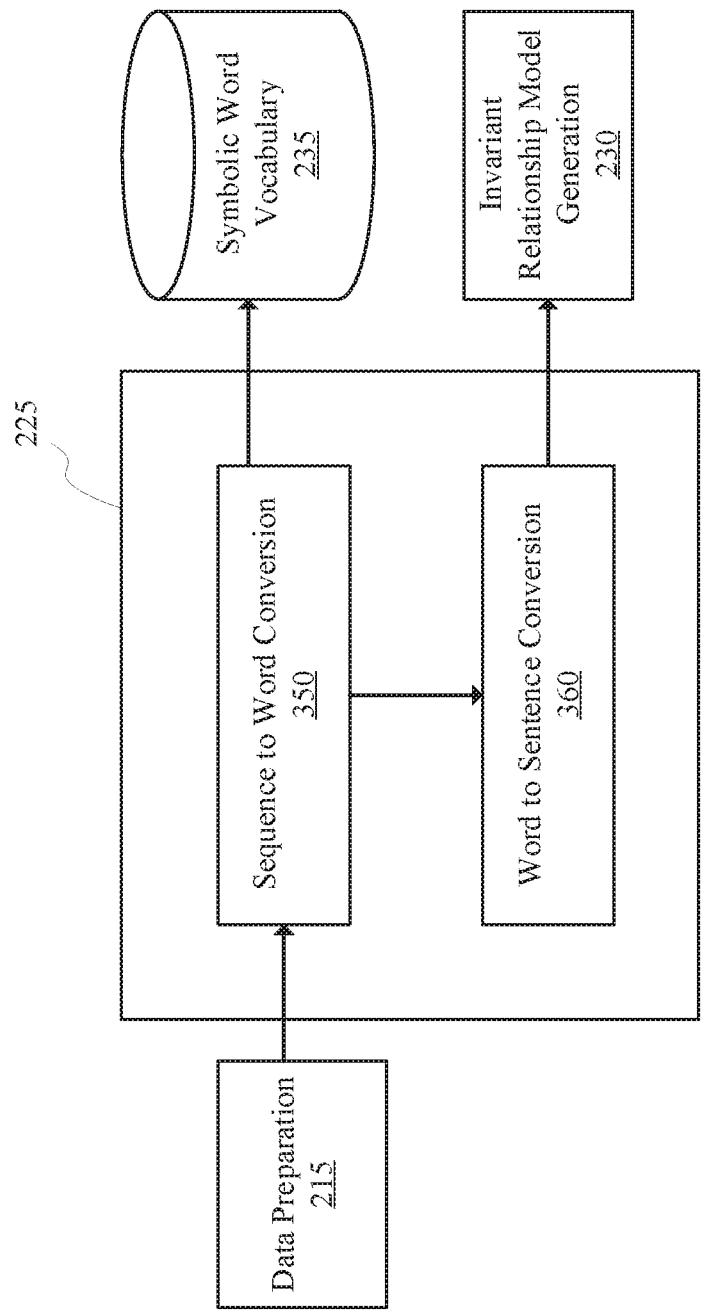
FIG. 4 is a block diagram illustrating a discrete event sequence conversion component, in accordance with an embodiment of the present invention.

Referring now to FIG. 4, a block diagram of a discrete event sequence conversion 225 (component) is illustratively depicted in accordance with an embodiment of the present invention.

FIG. 4 presents sub-components of the discrete event sequence conversion 225 (component) including sequence to word conversion 350 and word to sentence conversion 360. Discrete event sequence conversion 225 takes the output from data preparation 215 and generates sentences of discrete event sequences that are ready to be accepted by the invariant relationship model generation 230 (component).

Data preparation 215 performs the first-order data preprocessing to the discrete event sequences of sensors and converts them into sequences of characters. However, such format cannot be directly accepted by a neural machine translation model. Therefore, sequence to word conversion 350 splits the characters into words and sentences. Then, the neural machine translation model can translate the sentences of one sensor to the sentences of another, (in a similar manner to translating one language to another). The details of translation process will be described in the invariant relationship model generation 230.

Given the sequences of characters of all sensors produced by the data preparation 215 component, sequence to word conversion 350 composes words from sensor character sequences. According to an example embodiment, sequence to word conversion 350 splits characters into words of equal length, by fixing the length of one word to be a predetermined number of characters (for example, x) and using a sliding window of m (a second predetermined number) characters to generate the next word. By default, in an example embodiment, sequence to word conversion 350 set x=10 and m=1. However, sequence to word conversion 350 can provide flexibility to change the values of x and m. For example, given a sequence of characters of one sensor, sequence to word conversion 350 uses the first 10 characters to compose the first word, the second to the eleventh characters to compose the second word, and the third to the twelfth characters to compose the third word, etc. The distinct set of words for each sensor is considered as the vocabulary of that sensor, which will be used when generating word embeddings for the language model in the next component (invariant relationship model generation 230). Sequence to word conversion 350 performs the conversion from sequences of characters to sequences of words for every sensor. The generated sensor vocabularies are stored in symbolic word vocabulary 235 (database).

Once sequence to word conversion 350 obtains (for example, determines) sequences of words for all sensors, word to sentence conversion 360 generate sentences from the sequences of words (that can be processed by a neural machine translation model that translates at the sentence level). Similarly, word to sentence conversion 360 splits words into sentences of equal length, by setting the length of one sentence to be a variable number (for example, y) of words and using a sliding window of n words to generate the next sentence. By default, according to an example embodiment, word to sentence conversion 360 sets y=20 and n=20. However, word to sentence conversion 360 is flexible to change the values of y and n. For example, given a list of words of one sensor, word to sentence conversion 360 uses the first 20 words to compose the first sentence and the next 20 words to compose the second sentence, etc. Word to sentence conversion 360 performs the conversion from sequences of words to sequences of sentences for every sensor. The generated sequences of sentences are prepared as input and passed to the invariant relationship model generation 230 component.

Symbolic word vocabulary 235 (database) stores the sensor symbolic word vocabulary generated from discrete event sequence conversion 225. Symbolic word vocabulary 235 can be used as one of the inputs to the invariant relationship model generation 230. According to an example embodiment, the vocabulary is in a plain text file format.

Figure 5:
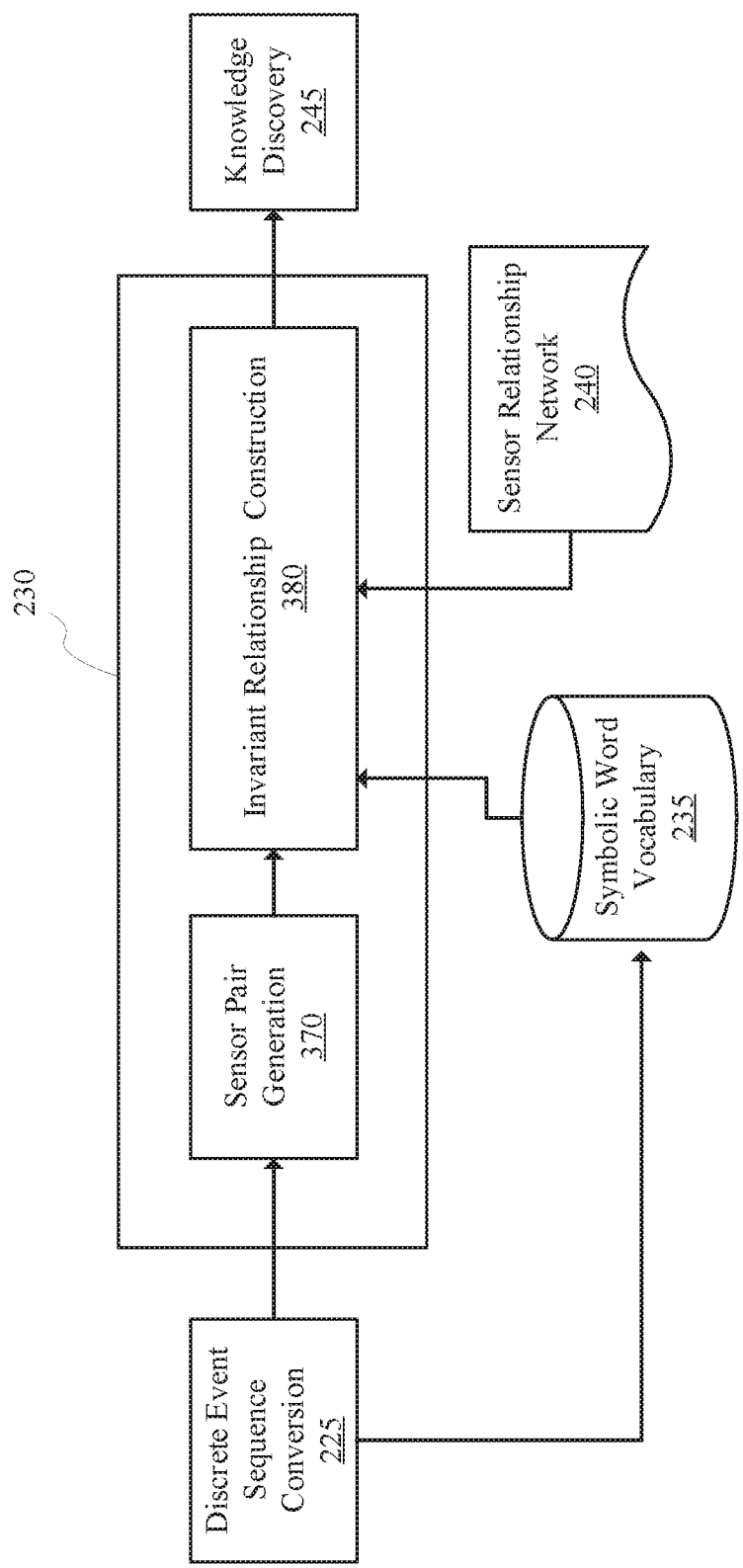
FIG. 5 is a block diagram of an invariant relationship model generation component, in accordance with an embodiment of the present invention.

Referring now to FIG. 5, a block diagram of an invariant relationship model generation 230 (component) is illustratively depicted in accordance with an embodiment of the present invention.

FIG. 5 illustrates subcomponents, input and output of invariant relationship model generation 230 component. The subcomponents include sensor pair generation 370 and invariant relationship construction 380. Invariant relationship model generation 230 takes the output from the discrete event sequence conversion 225, which can include (for example, essentially) sentences of all sensors in the system and builds sensor relationship network 240 using a neural machine translation (NMT) model. The generated sensor relationship network 240 represents invariant relationship of different strength among the sensors in the system and will be used by the knowledge discovery 245 component to explore valuable system-related information. Invariant relationship model generation 230 implements two sub-steps. Sensor pair generation 370 further filters out unnecessary sensors and prepares a list of sensor pairs for the next step. Invariant relationship construction 380 builds an NMT model for each pair of sensors in the system and generates the sensor relationship network 240. The sensor relationship network 240 can be generated without domain knowledge in contrast to systems that use extensive feature engineering effort, which are known to utilize a lot of domain-specific knowledge.

According to an example embodiment, sensor pair generation 370 generates a set of sensor pairs that are to be trained by invariant relationship construction 380. Note that the relationship built by translation model is directed. In other words, translating sentences of sensor x to sentences of sensor y is treated as a different pairwise relationship from translating sentences of sensor y to sentences of sensor x. Therefore, in an instance in which there are n sensors in the systems, the process results in n(n−1) sensor pairs. Considering the number of sensors in real-world systems, this could be in hundreds or thousands, and thus could be prohibitive to build translation model for every sensor pair (as the translation model in that instance would require an expense of resources and time). Therefore, data preparation 215 component performs the first order of reduction in the number of sensors during data preparation. The reduction can be determined to provide a predetermined minimum of information while reducing the expenditure on the translation model. Sensor pair generation 370 implements additional processes to further reduce the number of sensor pairs.

Heuristically, sensor pair generation 370 locates (for example, finds, identifies) sensors with no or very few variable state changes (that therefore) provide little to no indications towards building effective invariant relationship. Therefore, sensor pair generation 370 further remove those sensors that are mostly constant (for example, no state change) in the majority of sampling period and occasionally encounter state changes (for example, spikes) in only a few timestamps.

In some instances, the event sequences of some sensors can be very similar such that their similarity can be easily detected with naïve comparison methods. For example, these sensors may all utilize the same set of variables and exhibit same variable transitions at same timestamps. Those sensors can be considered by the system as highly similar to each other. For sensors that share high similarity, sensor pair generation 370 only picks up one representative sensor and discards the rest.

After filtering out (for example, some) redundant sensors, sensor pair generation 370 then passes the list of remaining sensor pairs to the next pairwise translation model training component (as described herein below with respect to FIG. 6).

Figure 6:
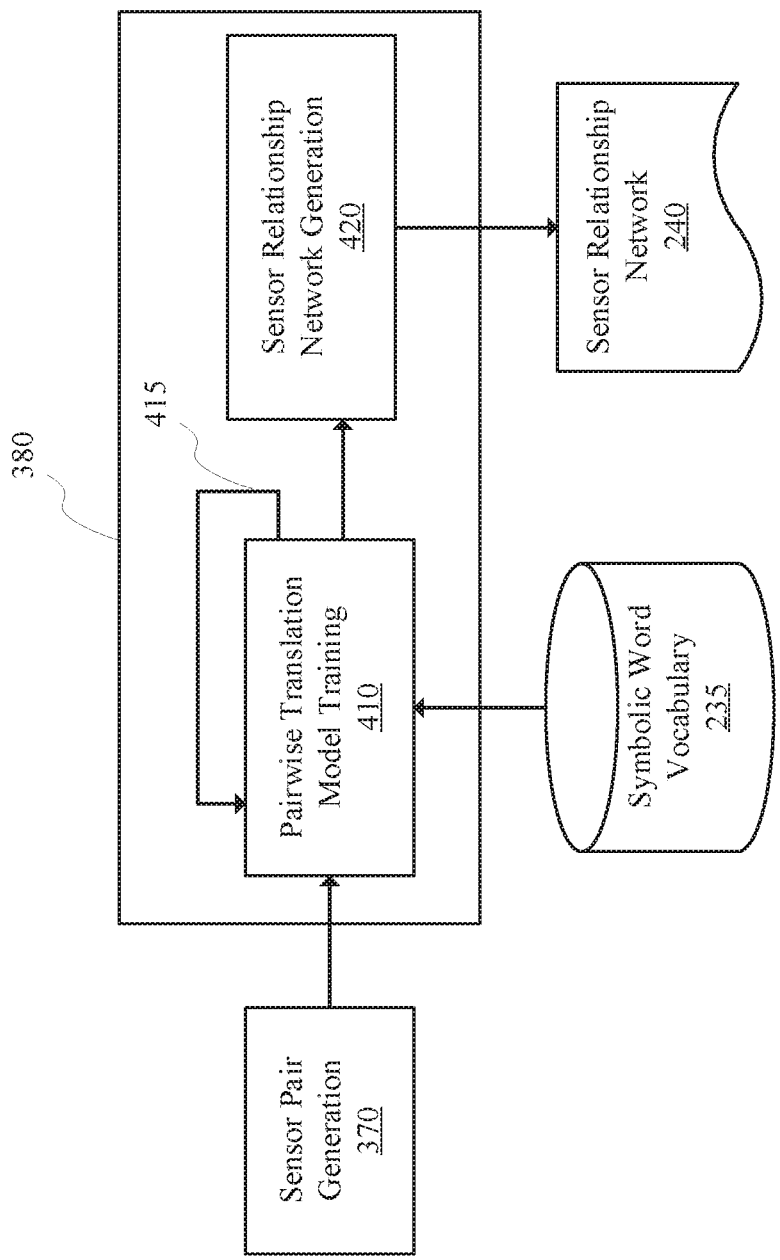
FIG. 6 is a block diagram illustrating an invariant relationship construction component, in accordance with an embodiment of the present invention.

Referring now to FIG. 6, a block diagram of an invariant relationship construction 380 (component) is illustratively depicted in accordance with an embodiment of the present invention.

FIG. 6 illustrates subcomponents, input and output of invariant relationship construction 380. Subcomponents of invariant relationship construction 380 include pairwise translation model training 410 and sensor relationship network generation 420. For each pair of sensors given by the previous sensor pair generation 370, pairwise translation model training 410 builds a neural machine translation (NMT) model to quantify the strength of the invariant relationship between the source and target sensors. Then, sensor relationship network generation 420 aggregates the quantification invariant relationship scores of all sensor pairs and generates the sensor relationship network 240. The sensor relationship network 240 is generated from all the training discrete sequences. The generation of the sensor relationship network 240 can be implemented in a one-shot process. The sensor relationship network 240 provides useful information for the knowledge discovery 245 component.

Figure 7:
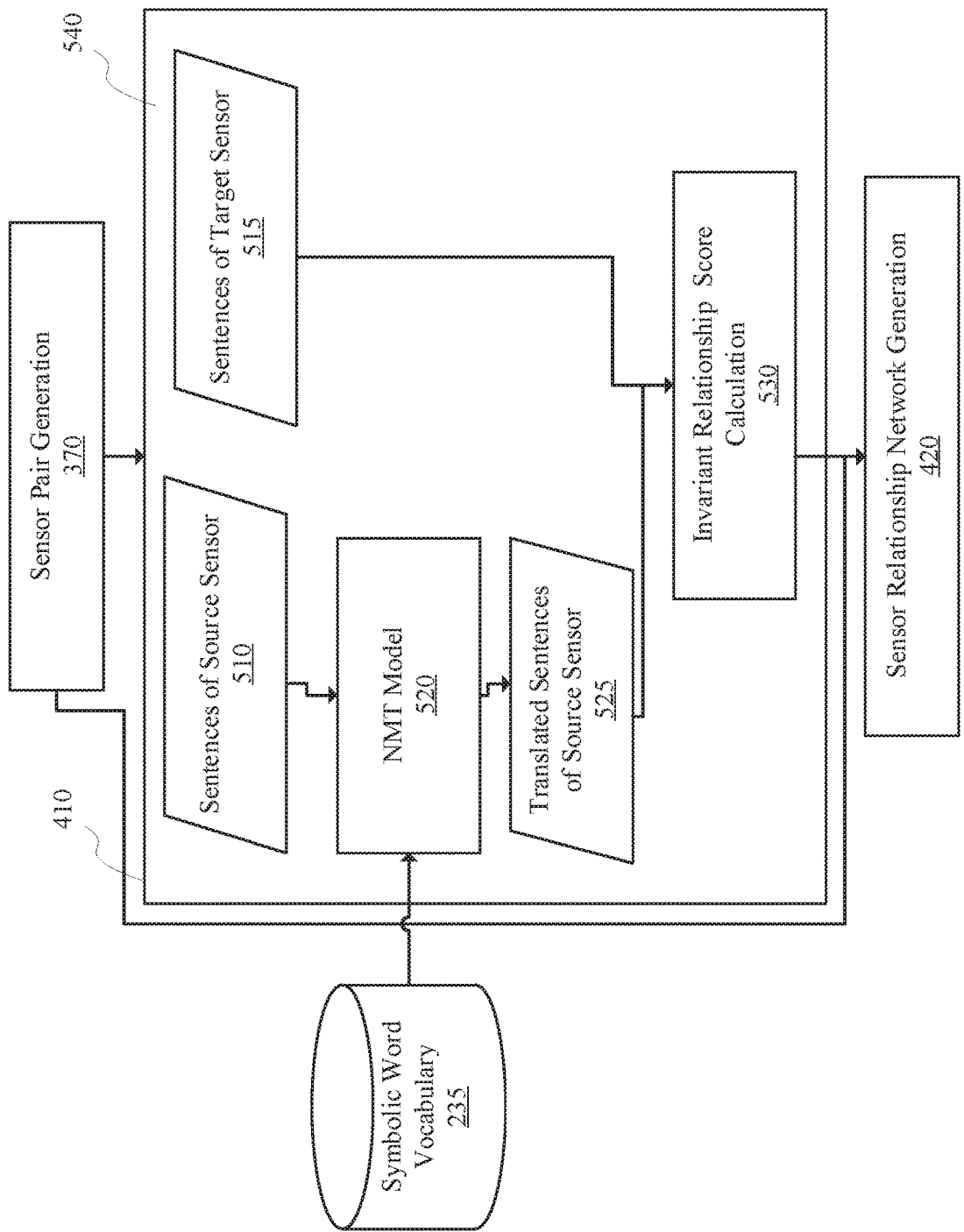
FIG. 7 is a block diagram illustrating a pairwise translation model training component, in accordance with an embodiment of the present invention.

Referring now to FIG. 7, a block diagram of pairwise translation model training 410 (component) is illustratively depicted in accordance with an embodiment of the present invention.

FIG. 7 illustrates the subcomponents of pairwise translation model training 410, which is essentially a standard training process of building a sequence-to-sequence (seq2seq) model. Pairwise translation model training 410 translates the sentences of source sensor 510 using the NMT model 520 (to form translated sentences of source sensor 525) and then compares the translated sentences with the sentences of target sensor 515 by applying invariant relationship score calculation 530 (component). Invariant relationship score calculation 530 calculates a score to quantify the strength of invariant relationship between the source and target sensors. The calculated scores of all sensor pairs are then passed to sensor relationship network generation 420.

According to example embodiments, the NMT model 520 used is a seq2seq models that provides effective neural machine translation systems for human language translation tasks. The NMT model can be a seq2seq model using long short-term memory (LSTM) unit and attention mechanism, implemented, for example, using an end-to-end open source machine learning platform such as TensorFlow. Given the sentences of the source sensor, the NMT model 520 takes the symbolic word vocabulary 235 generated in discrete event sequence conversion 225 to generate word embeddings and then perform translation sentence by sentence.

According to example embodiments, invariant relationship score calculation 530 compares the translated sentences and the sentences of the target sensor and calculates an invariant relationship score to quantify the strength of the pairwise relationship of the source and target sensors. For example, the quantification score can be a Bilingual Evaluation Understudy (BLEU) score. The BLEU can be used as a metric to quantitatively compare the machine translation with human translated references. The BLEU provides efficiency in computing the score without any human involvement. The score ranges from 0 to 100, with higher scores being better than lower scores. The NMT model 520 quantifies the invariant relationship between sensor pairs and provides a meaningful score to evaluate the strength of invariant relationship. The NMT model is implemented in a manner that prioritizes the ability of distinguishing strong and weak relationships over the ability of translation. Consequently, the system implements a simple and shallow network model over complex and deep network model and uses the same parameter settings to train the NMT model 520 for all sensor pairs. This allows the calculated scores to be comparable across different sensor pairs.

Figure 8:
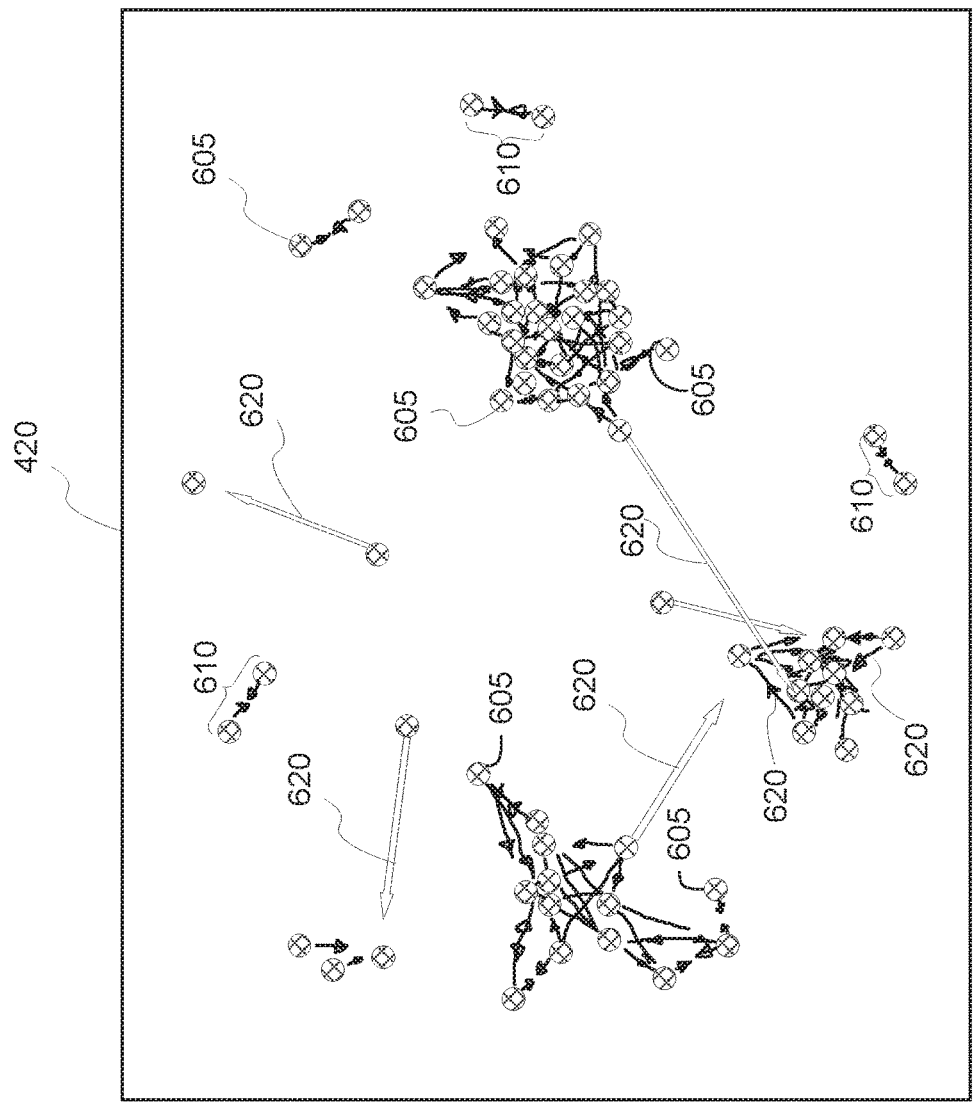
FIG. 8 is a block diagram illustrating a sensor relationship network generation component, in accordance with an embodiment of the present invention.

Referring now to FIG. 8, a block diagram of sensor relationship network generation 420 (component) is illustratively depicted in accordance with an embodiment of the present invention.

As shown in FIG. 8, sensor relationship network generation 420 collects the invariant relationship score from all sensor pairs 610 (sensors shown as 605) in the systems and classifies those scores into multiple categories based on the strength of connection 620, for example, three categories, such as strong, medium, and weak connections. The sensors 605 can be hardware sensors and/or software sensors. For each type of connection 620, sensor relationship network generation 420 can build a sensor relationship network 240. In the sensor relationship network 240, a node represents a sensor 605, a directed edge 620 between nodes represents the translation from one sensor 605 to another, and the weight of the edge is the invariant relationship score given the NMT model 620 trained on the source and target sensors 605.

The output of sensor relationship network generation 420 is the sensor relationship network 240. In the network graph, each node represents a sensor 605 from, for example, a physical power or chemical plant and each edge 620 between two sensors represents an interdependence between these two sensors. The interdependence relationship can originate from the same physical component or similar functionality. FIG. 8 shows the results of sensor relationship network generation 420. The sensor relationship network graph can be presented in a graphical interface so that system administrators can easily navigate the clustering structure of the sensor relationship. The connection among different sensors 605 generates clustering structure. A set of sensors 605 can form a group with strong connections 620 (for example, a strong correlation between the output of the sensors) within the group but weak or no connections 620 across to other sensors (for example, a weak or no correlation between the output of the sensors). This group of sensors 605 can correspond to the same physical component or same functionality.

Figure 9:
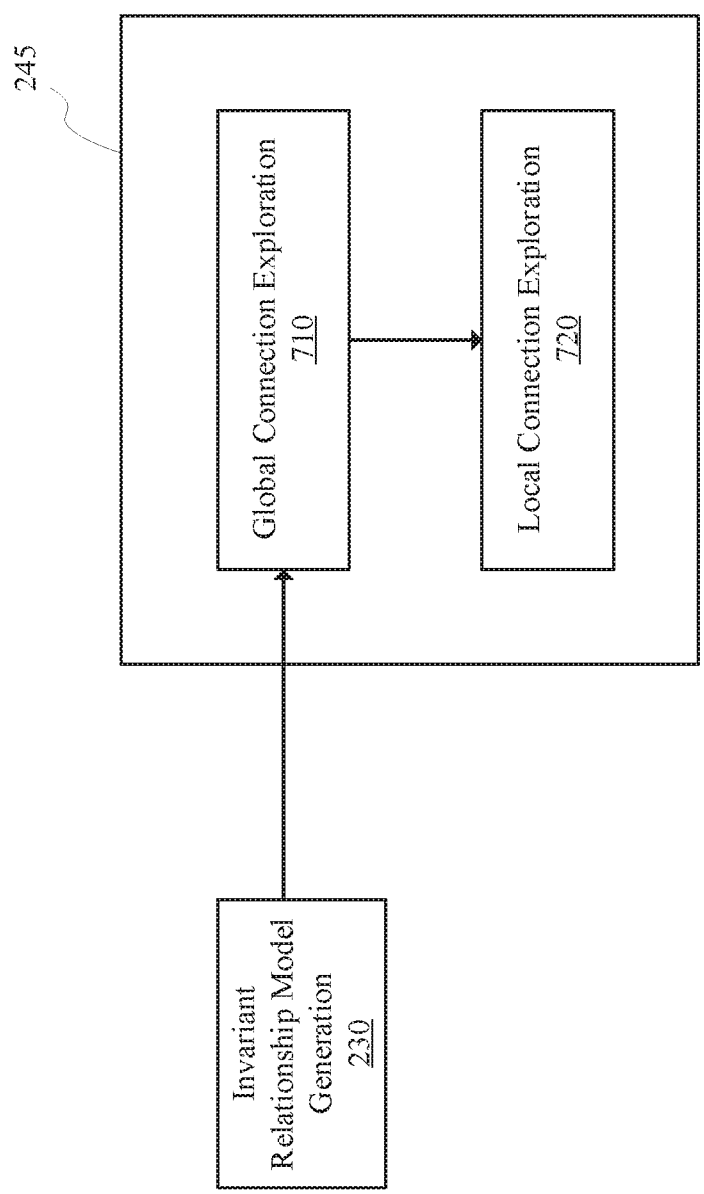
FIG. 9 is a block diagram illustrating a knowledge discovery component, in accordance with an embodiment of the present invention.

Referring now to FIG. 9, a block diagram of knowledge discovery 245 (component) is illustratively depicted in accordance with an embodiment of the present invention.

FIG. 9 illustrates the subcomponents of knowledge discovery 245 (component). As shown, knowledge discovery 245 includes global connection exploration 710 and local connection exploration 720. The invariant relationship model generation 230 component generates sensor relationship network 240 of different connection strength. Knowledge discovery 245 analyzes the network and provides useful guidance for system administrators, such as analysis of the relationships among the sensors in the system, or details and information to facilitate the tracking of problematic sensors when any anomaly happens in fault diagnosis.

In the sensor relationship network 240 generated by the invariant relationship model generation 230 component, knowledge discovery 245 (for example, by implementing global connection exploration 710) can observe (for example, some) popular sensors because they are connected to almost every other sensor in the system. There are two ways to explain (or analyze) the presence of those popular sensors:

Those sensors may be analyzed as recording basic operations and functionalities of the system. Consequently, the state changes in those sensors can impact all other sensors in the system. casein these instances, knowledge discovery 245 marks those sensors as critical ones.

The characteristics of the event sequences of these (critical) sensors can be difficult for NMT models 520 to capture. In many instances, there may be lack of enough state changes during the entire sampling period. When those sensors act as target sensors, the NMT model 520 will highly likely translate no matter the difference of the source sentences into sentences composed of one constant word (for example, there is only one unique character in the word). In such situation, even though the NMT models 520 fail to capture any state changes, the NMT models 520 are still able to provide high invariant relationship scores (due to large portion of constant words in sentences of those sensors). casein these cases, knowledge discovery 245 discards those sensors.

In many applications, it can be difficult to distinguish the aforementioned two explanations without the confirmation from system administrator. So, global connection exploration 710 can discard those popular sensors and local connection exploration 720 can perform further explorations on the revealed local connections.

After popular sensors in the global connection network are removed, local connection exploration 720 analyzes local connections of the remaining sensors. Local connection exploration 720 may observe that some of those remaining sensors form into clusters. Local connection exploration 720 can determine in some instances that sensors in the same cluster come from the same system component or perform similar functionality. local connection exploration 720 can identify that some clusters are independent while some are connected to certain sensors (that are outside of the cluster). Those sensors can be identified as critical sensors that act as connecting points to neighboring clusters and may be responsible to error propagation from one cluster to another.

Figure 10:
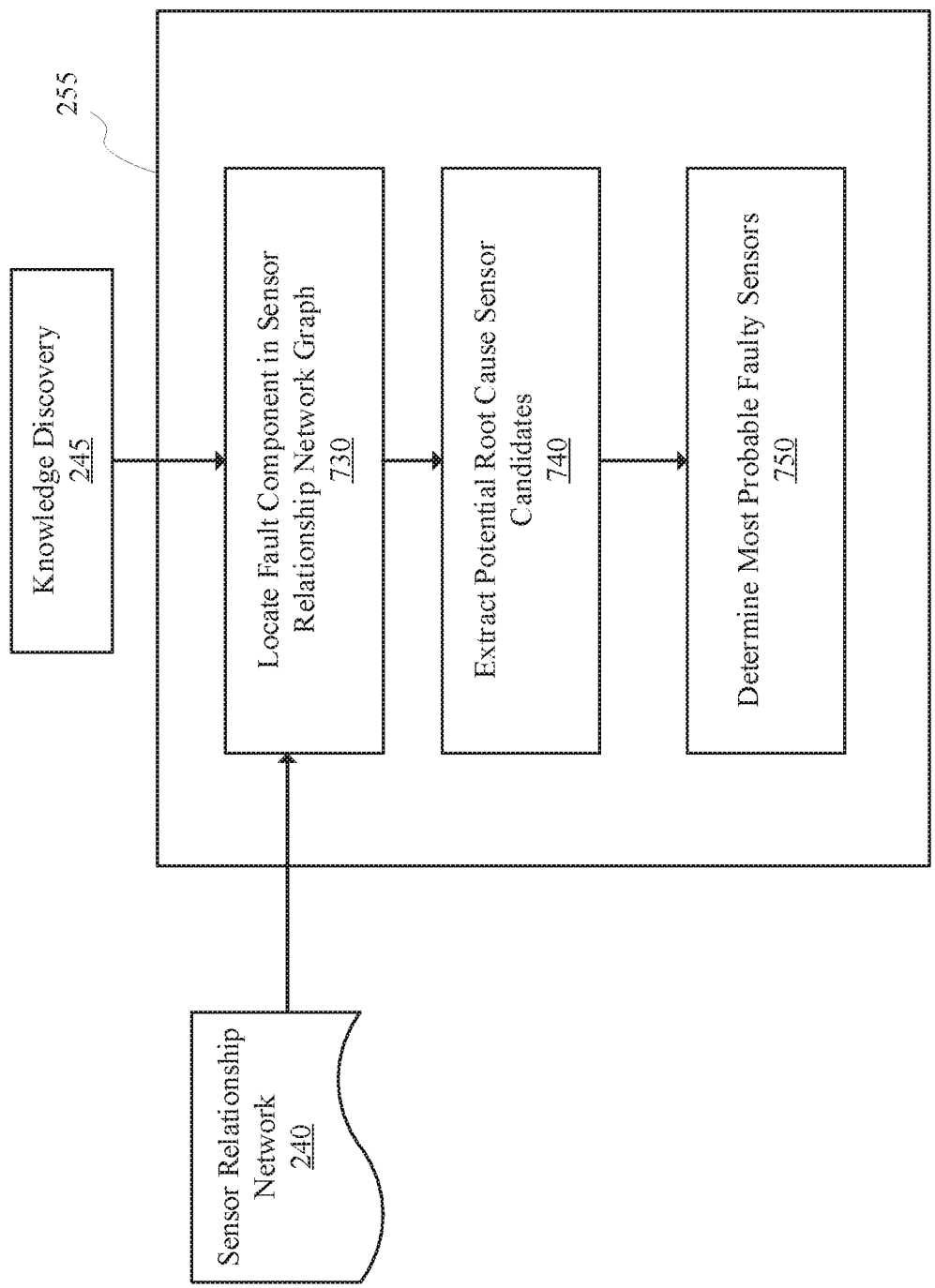
FIG. 10 is a block diagram illustrating a, in accordance with an embodiment of the present invention.

Referring now to FIG. 10, a block diagram of knowledge-guided fault diagnosis 255 (component) is illustratively depicted in accordance with an embodiment of the present invention.

When system failure occurs, system administrators can examine the sensor relationship network graph with the clustering connection knowledge based on the determinations by knowledge discovery 245 to perform fault diagnosis. FIG. 10 illustrates the subcomponents of knowledge-guided fault diagnosis 255. As shown, knowledge-guided fault diagnosis 255 includes subcomponents to locate fault component in sensor relationship network graph 730, extract potential root cause sensor candidates 740 and determine most probable faulty sensors 750.

When system fault occurs, system administrators can locate the faulty component based on the sensor network graph and the global/local connection knowledge produced from knowledge discovery 245.

When the faulty cluster is identified in the sensor relationship network graph, the knowledge-guided fault diagnosis 255 calculates the in-degree and out-degree of each sensor. The connection between any two sensors is directional because the pairwise relationship is based on translation from one sensor into the other in invariant relationship model generation 230. Therefore, each sensor can have in-degree and out-degree values. The in-degree is defined as the number of connections from other sensors which lead into the current sensor. The out-degree is defined as the number of connections which are originated from the current sensor and lead to other sensors. Sensor connection paths can be extracted starting from the highest out-degree sensors and ending at the highest in-degree sensors. The sensor connection path describes the logical or physical flow among multiple sensors. The set of sensors along with the path will be extracted as the faulty sensor candidate.

Locate fault component in sensor relationship network graph 730 combines the sensor connection paths and anomalous sensor and determines the most suspicious faulty sensors. If the anomalous sensor is the originating sensor, then the potential root cause sensor is the anomalous sensor. If the anomalous sensor is either in the middle or the end sensor along with the sensor connection path, then any of the upstream sensor or the current anomalous sensor might be the potential root cause sensors. Determine most probable faulty sensors 750 implements a rule to generate the most suspicious faulty sensor and help system administrators locate the potential root cause of system failure and provide remedy solutions.

Figure 11:
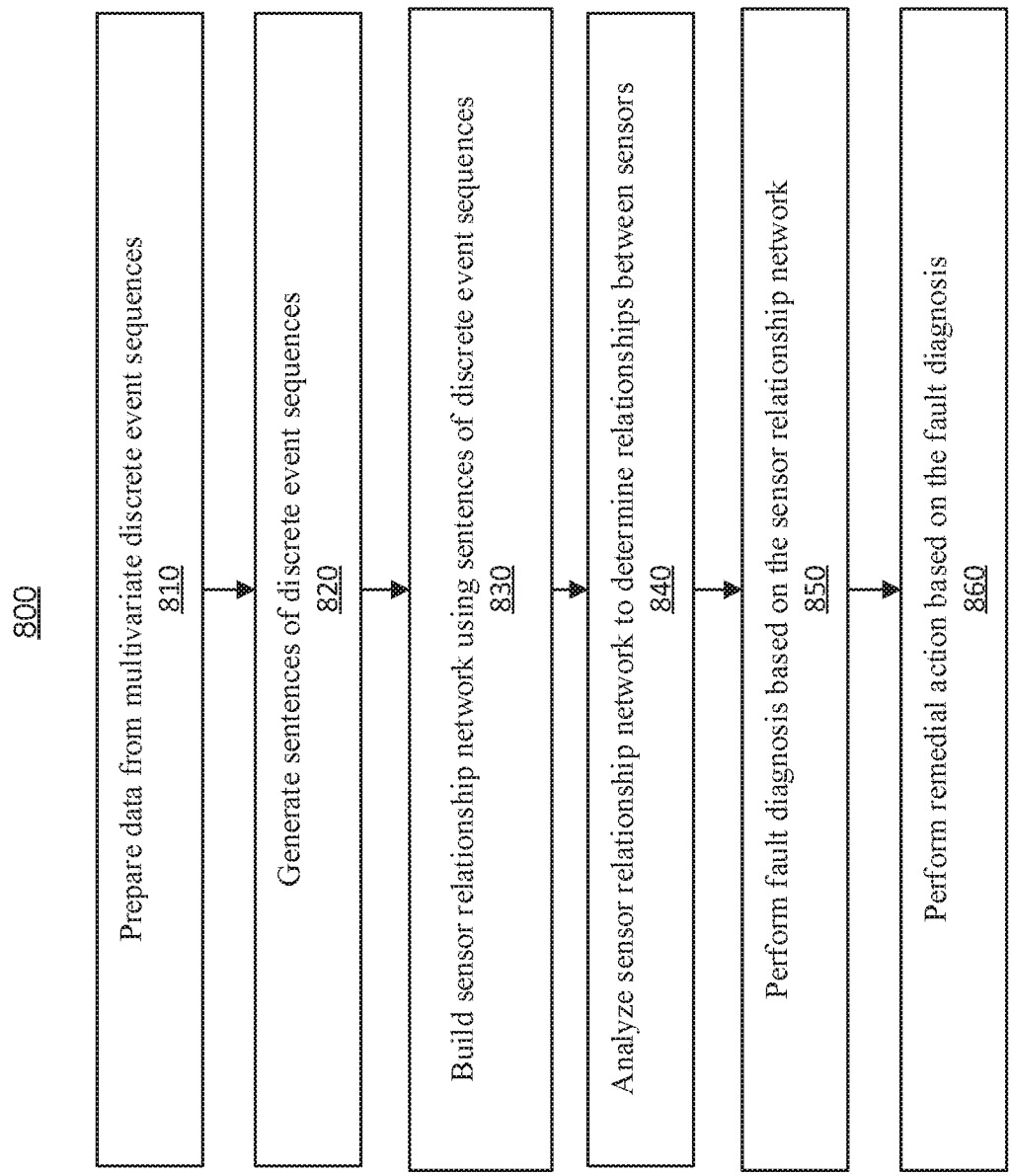
FIG. 11 is a flow diagram illustrating a method for temporal discrete event analytics, in accordance with an embodiment of the present invention.

Referring now to FIG. 11, a method 800 for temporal discrete event analytics is illustratively depicted in accordance with an embodiment of the present invention.

At block 810, system 200 prepare data from multivariate discrete event sequence. For example, system 200 can receive multivariate discrete event series that include discrete categorical event sequences collected from sensors in a complex system, such as a power plant or chemical plant, etc.

At block 820, system 200 generates sentences of discrete event sequences. For example, system 200 perform sequence to word conversion and compose words from sensor character sequences. System 200 can then implement word to sentence conversion.

At block 830, system 200 builds sensor relationship network using sentences of discrete event sequences. This sensor relationship network is automatically generated (for example, in response to generating the sentences as described at block 820) from the discrete event sequence without any domain knowledge. the system 200 implements a data-driven approach.

At block 840, system 200 analyzes the sensor relationship network to determine relationships between sensors.

At block 850, system 200 performs fault diagnosis based on the sensor relationship network.

At block 850, system 200 performs a remedial action to address the fault diagnosis. For example, system administrators can use the sensor relationship network 240 to find out which sensor(s) are connected to the faulty ones. When the faulty sensor is the root cause of the system failure, the connected sensors will be impacted. System administrators can disconnect (or re-route, adjust for the impact of the faulty sensor, etc.) the impacted sensors and isolate the faulty one. The sensor network helps system administrators reduce the cost of service disruption during fault diagnosis.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for evaluating a computer system using temporal discrete event analytics, comprising:
   generating sentences of discrete event sequences for a plurality of sensors;
   building a sensor relationship network in response to generating the sentences of discrete event sequences;
   analyzing the sensor relationship network to determine relationships between the plurality of sensors;
   performing fault diagnosis based on the sensor relationship network and the relationships between the plurality of sensors; and
   performing a remedial action to address the fault diagnosis;
   wherein building the sensor relationship network further comprises:
      generating sensor pairs from the plurality of sensors; and
      applying a neural machine translation (NMT) model to quantify strength of invariant relationship between at least one source sensor and at least one target sensor, and
   wherein applying the NMT model to quantify strength of invariant relationship further comprises:
      comparing at least one translated sentence of the at least one source sensor and at least one sentence of the at least one target sensor; and calculating an invariant relationship score to quantify the strength a pairwise relationship of the at least one source sensor and the at least one target sensor.

2. The method as recited in claim 1, further comprising:
   receiving a corpus of multivariate discrete event sequences; and
   extracting the discrete event sequences from the corpus of multivariate discrete event sequences.

3. The method as recited in claim 2, further comprising:
   performing first-order reduction of a number of sensor pairs in the plurality of sensors.

4. The method as recited in claim 1, wherein generating sentences of discrete event sequences further comprises:
   converting discrete event sequences to words; and converting the words to the sentences of discrete event sequences.

5. The method as recited in claim 4, wherein converting the discrete event sequences to the words further comprises:
   forming a symbolic word vocabulary.

6. The method as recited in claim 1, further comprising:
   generating word embeddings using a symbolic word vocabulary; and performing translation of the discrete event sequences on a sentence by sentence basis.

7. The method as recited in claim 1, wherein the invariant relationship score is a bilingual evaluation understudy (BLEU) score.

8. The method as recited in claim 1, wherein analyzing the sensor relationship network to determine relationships between the plurality of sensors further comprises:
   identifying popular sensors that act as target sensors; and discarding the popular sensors.

9. The method as recited in claim 1, wherein analyzing the sensor relationship network to determine relationships between the plurality of sensors further comprises:
   determining at least one cluster of sensors; and determining whether the at least one cluster is connected with at least one particular sensor.

10. The method as recited in claim 1, wherein building the sensor relationship network using the sentences of discrete event sequences further comprises:
    building the sensor relationship network without domain knowledge.

11. A computer system for evaluating another computer system using temporal discrete event analytics, comprising:
    a processor device operatively coupled to a memory device, the processor device being configured to:
    generate sentences of discrete event sequences for a plurality of sensors;
    build a sensor relationship network in response to generating the sentences of discrete event sequences;
    analyze the sensor relationship network to determine relationships between the plurality of sensors;
    perform fault diagnosis based on the sensor relationship network; and
    perform a remedial action to address the fault diagnosis;
    wherein building the sensor relationship network further comprises the processor device configured to:
       generating sensor pairs from the plurality of sensors; and
       applying a neural machine translation (NMT) model to quantify strength of invariant relationship between at least one source sensor and at least one target sensor, and
    wherein applying the NMT model to quantify strength of invariant relationship further comprises the processor device configured to:
       comparing at least one translated sentence of the at least one source sensor and at least one sentence of the at least one target sensor; and calculating an invariant relationship score to quantify the strength a pairwise relationship of the at least one source sensor and the at least one target sensor.

12. The system as recited in claim 11, wherein the processor device is further configured to:
    receive a corpus of multivariate discrete event sequences; and
    extract the discrete event sequences from the corpus of multivariate discrete event sequences.

13. The system as recited in claim 11, wherein the processor device is further configured to:
    perform first-order reduction of a number of sensor pairs in the plurality of sensors.

14. The system as recited in claim 11, wherein, when generating sentences of discrete event sequences, the processor device is further configured to:
    convert discrete event sequences to words; and convert the words to the sentences of discrete event sequences.

15. The system as recited in claim 14, wherein, when converting the discrete event sequences to the words, the processor device is further configured to:
    form a symbolic word vocabulary.

16. The system as recited in claim 11, wherein the processor device is further configured to:
    generate word embeddings using a symbolic word vocabulary; and perform translation of the discrete event sequences on a sentence by sentence basis.

* * * * *